UNITED STATES PATENT OFFICE.

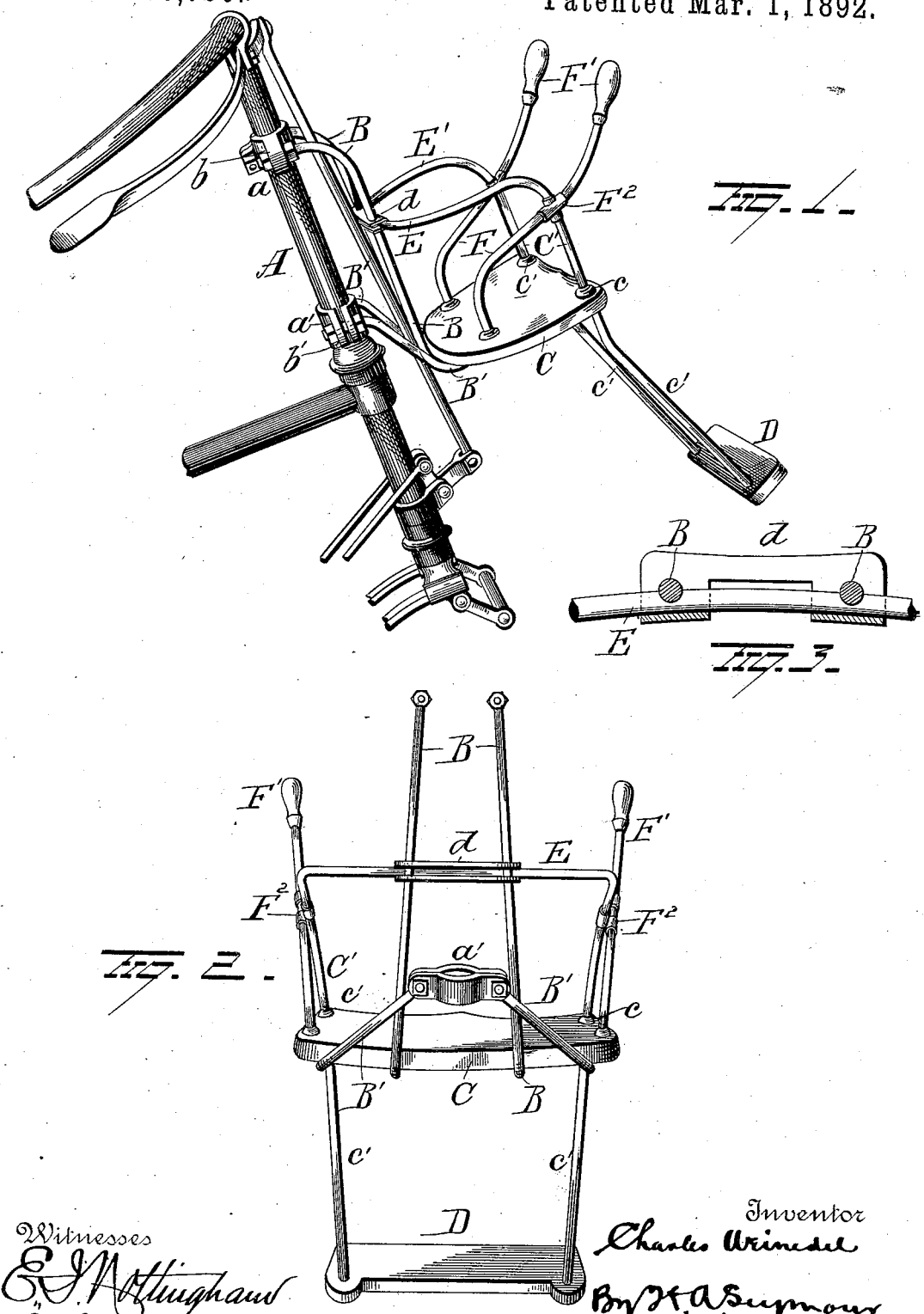

CHARLES WEINEDEL, OF LOUISVILLE, KENTUCKY.

CHILD'S SEAT FOR BICYCLES.

SPECIFICATION forming part of Letters Patent No. 469,760, dated March 1, 1892.

Application filed October 23, 1891. Serial No. 409,598. (No model.)

*To all whom it may concern:*

Be it known that I, CHARLES WEINEDEL, a citizen of Louisville, in the county of Jefferson and State of Kentucky, have invented certain new and useful Improvements in Children's Seats for Bicycles; and I do hereby declare the following to be a full, clear, and exact description of the invention, such as will enable others skilled in the art to which it appertains to make and use the same.

My invention relates to an improvement in bicycles, and more particularly to an improved child's seat adapted to be secured to the bicycle, the object of the invention being to produce a simple, cheap, and efficient child's seat for a bicycle and to provide simple means for attaching it to the front bar of the machine.

With this object in view the invention consists in certain novel features of construction and combinations and arrangements of parts, as hereinafter set forth, and pointed out in the claims.

In the accompanying drawings, Figure 1 is a view of a portion of a bicycle, showing my improved child's seat attached thereto. Fig. 2 is a rear view of the seat. Fig. 3 is a detail view.

A represents the front bar of a bicycle of the "Safety" type, to which two collars or clamps $a$ $a'$ are secured. The upper collar or clamp $a$ is provided at each side of the bar A with eyes $b$ for the reception of the upper (preferably hooked) ends of two supporting-arms B B. The arms B are curved somewhat at their upper ends and at their lower ends are extended beneath and secured to a seat C. Other supporting-arms B' B' are secured to the under side of the seat near its outer edges and extended rearwardly to pass through perforated lugs $b'$, projecting from opposite sides of the lower collar or clamp $a'$. Extending through the front corners of the seat C is a rod C', the ends of which are extended downwardly and forwardly and at their lower free ends are secured to a crossbar D, thus constituting a foot-rest for the occupant of the seat. Above the seat said rod is provided with nuts $c$ to prevent the displacement of the downwardly-extending arms $c'$ of the foot-rest. The said rod extends upwardly from the seat C and is bent rearwardly and curved to produce a back-support E and arm-supports E'. The back E is securely connected and braced with the upper supporting rods or arms B by means of a connecting-link $d$. Arms F are secured at their lower ends to the seat C and extended forwardly and upwardly, being provided at their free ends with handles F'. At the points where the arms F cross the arm-rests E they are secured to said arm-rests by means of connecting-links F².

A child's seat for a bicycle thus constructed is very simple and effectual in the performance of its functions and may be easily, quickly, and securely fastened to the front bar of the machine.

Having fully described my invention, what I claim as new, and desire to secure by Letters Patent, is—

1. A child's seat for a bicycle, comprising a seat portion, a back and arms for supporting a foot-rest, composed of a single rod, and means for securing the device to a bicycle, substantially as set forth.

2. A child's seat for a bicycle, comprising a seat portion, a back-support, and a foot-rest, supporting-arms projecting from the seat portion and secured to the bicycle and other supporting-arms projecting from said seat portion and secured to the bicycle, and a link for securing said last-mentioned arms to the back portion, substantially as set forth.

3. The combination, with a child's seat for a bicycle, of arms secured to the seat portion and extending upwardly and forwardly therefrom, and handles on the free ends of said arms, substantially as set forth.

4. The combination, with a child's seat for a bicycle, and a back and arm support therefor, of arms secured to the seat portion and provided with handles at their free ends, and links for securing said arms to the arm-rests, substantially as set forth.

5. The combination, with the front bar of a bicycle and clamps having eyes thereon secured to said front bar, of a child's seat, arms or supports projecting from the seat portion of said seat and secured in the eyes of said collars, and a back-support secured to said seat portion and to one pair of supporting-arms, substantially as set forth.

In testimony whereof I have signed this specification in the presence of two subscribing witnesses.

CHARLES WEINEDEL.

Witnesses:
EDWARD MILLER,
HARRY WEINEDEL.